(12) United States Patent
Grossblatt et al.

(10) Patent No.: US 8,498,910 B1
(45) Date of Patent: Jul. 30, 2013

(54) PAYROLL CHANGE ALERT

(75) Inventors: Lesley Kim Grossblatt, San Francisco, CA (US); Lucinda Kathryn Foss, San Francisco, CA (US); Sandra M. Edwards, Sunnyvale, CA (US); Kyle Greene Kilat, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 532 days.

(21) Appl. No.: 12/772,121

(22) Filed: Apr. 30, 2010

(51) Int. Cl.
G06F 15/02 (2006.01)
B42D 15/00 (2006.01)

(52) U.S. Cl.
USPC .............................................. 705/32; 283/58

(58) Field of Classification Search
None
See application file for complete search history.

(56) References Cited

U.S. PATENT DOCUMENTS

| | | | |
|---|---|---|---|
| 6,411,938 B1 * | 6/2002 | Gates et al. ...................... | 705/30 |
| 7,233,919 B1 * | 6/2007 | Braberg et al. .................. | 705/32 |
| 2003/0200142 A1 * | 10/2003 | Hicks et al. ...................... | 705/14 |
| 2004/0019559 A1 * | 1/2004 | Moenickheim et al. ........ | 705/40 |
| 2005/0188199 A1 * | 8/2005 | Smith et al. .................... | 713/165 |
| 2006/0010035 A1 * | 1/2006 | Allen et al. ...................... | 705/14 |
| 2006/0020545 A1 * | 1/2006 | Lindheimer et al. ............ | 705/40 |

* cited by examiner

*Primary Examiner* — Matthew Gart
*Assistant Examiner* — Michael Maicher
(74) *Attorney, Agent, or Firm* — Osha Liang LLP

(57) ABSTRACT

The invention relates to a method for payroll notification. The method steps include obtaining, by a processor, a payroll rule comprising a message and a condition requiring a payroll dollar amount, obtaining, by the processor, the payroll dollar amount from a first paystub having a first gross pay and a first net pay for an employee evaluating, by the processor, the condition of the payroll rule, where the first gross pay equals a second gross pay on a second paystub having a second net pay for the employee, and outputting, by the processor and in response to the condition being satisfied, the message of the payroll rule onto the first paystub explaining a non-zero difference between the first net pay and the second net pay.

20 Claims, 6 Drawing Sheets

Paystub 300

Acme Mining Company
123 Willow Pl
San Jose, CA 95118

Division: Accounting
Check #: 0000111223
Date of issue: 2/02/2009

Fred Johnson
1119 Oeste Dr
Davis, CA 95616

Empl ID: 0000119
Job title: Rock Inspector
Tax allowances: 2

| Hours and Earnings | | | Taxes | |
|---|---|---|---|---|
| | Current Earnings | Y-T-D Earnings | Federal Withholding | $311.14 |
| | $1575.33 | $5754.45 | State Withholding | $95.33 |
| | | | Social Security Withholding* | $0.00 |

| Pre-tax Deductions | Post-tax Deductions | Employer Paid |
|---|---|---|
| Medical $155.44<br>Dental $25.11<br>Vision $16.21 | Disability $5.33 | Life $24.31 |

| | Gross | Taxable | Taxes | Misc. Deductions | NET |
|---|---|---|---|---|---|
| Current: | $1,575.33 | $1,378.57 | $406.47 | $202.09 | $966.77 |
| Year-to-date: | $157,540.45 | $104,851.12 | $32,121.77 | $55,904.51 | $69,514.17 |

ALERTS 305

* You have reached the limit for social security withholding by exceeding the $150,000 social security wage base. No further social security deductions will be made this year.

FIG. 3

PAYROLL CHANGE ALERT

BACKGROUND

Payroll processing is an arduous task for many employers. Before the advent of modern computer systems, payroll calculations were conducted manually and checks were written by hand. Accordingly, this system was replete with human error and resulted in substantial inefficiency. As personal, small business, and enterprise accounting software became ubiquitous, these inefficiencies were largely eliminated.

Along with the advancement of technologies, so too has the complexity and scope of payroll processing increased. Personal retirement accounts, flexible spending accounts, and a myriad of pre- and post-tax itemizations have transformed the simple pay calculations of the past to a maze of interdependencies. Software systems have also grown in complexity, and for many companies it has become more cost-effective to outsource their payroll processing to a third party. Among other benefits, outsourcing eliminates the need to maintain in-house staff and decreases liability and work required to maintain compliance with ever-changing legislative requirements.

For those who do not have the luxury of outsourcing their payroll, as well as for payroll processing companies themselves, a myriad of payroll software solutions exist. As expected, these software solutions allow employers to print paychecks and paystubs, and are also increasingly integrated with other financial software applications both inside and outside of the company.

SUMMARY

In general, in one aspect, the invention relates to a method for payroll notification. The method steps include obtaining, by a processor, a payroll rule comprising a message and a condition requiring a payroll dollar amount, obtaining, by the processor, the payroll dollar amount from a first paystub having a first gross pay and a first net pay for an employee evaluating, by the processor, the condition of the payroll rule, where the first gross pay equals a second gross pay on a second paystub having a second net pay for the employee, and outputting, by the processor and in response to the condition being satisfied, the message of the payroll rule onto the first paystub explaining a non-zero difference between the first net pay and the second net pay.

In general, in one aspect, the invention relates to a computer-readable storage medium storing a plurality of instructions for payroll notification. The instructions, when executed by the computer, include functionality to obtain a payroll rule comprising a message and a condition requiring a payroll dollar amount, obtain the payroll dollar amount from a first paystub having a first gross pay and a first net pay for an employee, evaluate the condition of the payroll rule, where the first gross pay equals a second gross pay on a second paystub having a second net pay for the employee, and output, in response to the condition being satisfied, the message of the payroll rule on the first paystub explaining a non-zero difference between the first net pay and the second net pay.

In general, in one aspect, the invention relates to a system for payroll notification. The system includes a processor, a repository storing a first paystub having a first gross pay and a first net pay for an employee, where the first gross pay is different than a second gross pay on a second paystub having a second net pay for the employee, a payroll engine executing on the processor and configured to obtain a payroll rule comprising a message and a condition requiring a payroll dollar amount from the first paystub, and a message module executing on the processor and configured to output, onto the first paystub and in response to the condition being satisfied, the message of the payroll rule explaining a non-zero difference between the first net pay and the second net pay.

Other aspects of the invention will be apparent from the following description and the appended claims.

BRIEF DESCRIPTION OF DRAWINGS

FIG. 3 depicts an example paystub in accordance with one or more embodiments of the invention.

DETAILED DESCRIPTION

Figure 1:
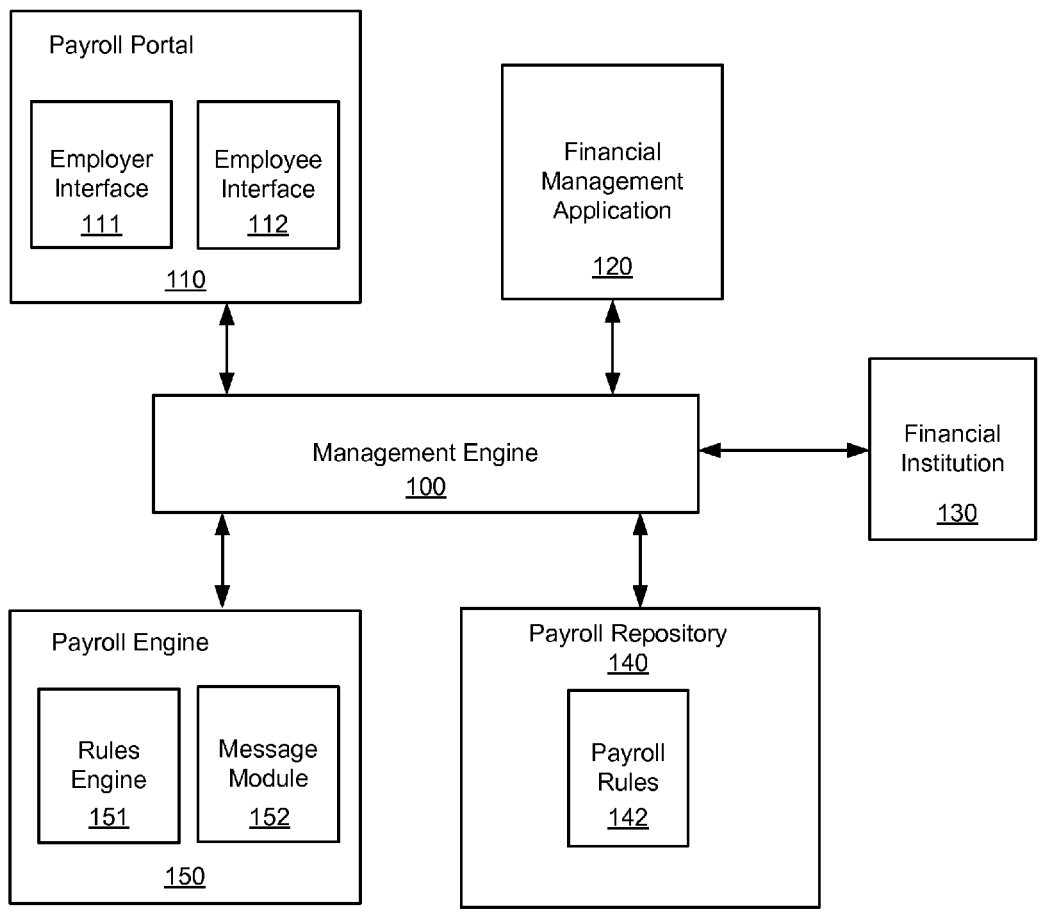
FIG. 1 depicts a schematic block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for payroll notifications. In general, embodiments of the invention output a message to employers, employees, and/or other entities when a condition associated with a payroll rule and requiring at least one payroll dollar amount is satisfied. The payroll dollar amount may be obtained from an employee's paystub and the message may be outputted onto the employee's paystub.

For purposes of this disclosure, the term payroll processing may refer to the application of one or more rules, processing one or more payroll calculations, processing an external payroll software and/or other related software applications, generating one or more payroll amounts, generating one or more payroll reports, general payroll-related jobs/tasks and/or periodic payroll processing resulting in the payment of one or more employees, vendors, and/or third parties.

In one or more embodiments of the invention, a payroll deduction is a dollar amount deducted from an employee's pay (i.e., gross pay and/or net pay) for a given pay period (i.e., pay cycle). The dollar amount of the payroll deduction may correspond to a percentage (e.g., 8.25%) of the employee's pay. Federal tax withholding, state tax withholding, Medicare withholding, disability insurance withholding, and social security withholding are all examples of percentage-based payroll deductions. Alternatively, the dollar amount of the payroll deduction may correspond to a fixed or absolute amount (e.g., $225.45) regardless of the employee's pay. A court ordered withholding and a health insurance premium are both examples of fixed or absolute payroll deductions. Those skilled in the art, having the benefit of this detailed description, will appreciate that if the employee has different deduction amounts between two pay periods, the employee will most likely have different net pay amounts as well.

In one or more embodiments of the invention, a paystub is issued to an employee for a pay period. In some cases, the paystub is issued with a paycheck for the pay period. The paystub includes multiple payroll fields for conveying payroll information to the employee. Specifically, the payroll fields include dollar amounts used, directly or indirectly, in the calculation of the employee's net pay (i.e., payroll dollar amounts). Alternatively, the payroll fields include labels (e.g., strings values) containing information related to the paycheck, the employee, and/or the employer. For example, one or more payroll fields may be populated with federal tax withholding, state tax withholding, medical insurance withholding, disability withholding, current earnings, year-to-date (YTD) earnings, 401K deduction, employee stock purchase plan (ESPP) contributions, net pay, gross pay, YTD earnings and vacation pay. As another example, one or more payroll fields may be populated with tax exemption information, employee name and address, business unit, employee start date, and employee position. The paystub may be a hardcopy document (i.e., paper) with the multiple payroll fields printed on the hardcopy document. Alternatively, the paystub may be an electronic document or electronic image available for electronic transmission (e.g., email) and/or electronic viewing (i.e., on a display device).

FIG. 1 shows a system in accordance with one or more embodiments of the invention. As shown in FIG. 1, the system has multiple components including a payroll portal (110) with an employer interface (111) and an employee interface (112); a payroll engine (150) with a rules engine (151) and a message module (152); a payroll repository (140) having payroll rules (142); and a management engine (100). The system may interface with a financial institution (130) and/or a financial management application (120). These components may be located on the same device (e.g., a server, mainframe, desktop Personal Computer (PC), laptop, Personal Digital Assistant (PDA), telephone, mobile phone, smart phone, kiosk, cable box, and any other hardware device) or may be located on separate devices connected by a network (e.g., the Internet), with wired and/or wireless segments. Those skilled in the art will appreciate that there may be more than one of each separate component running on a device, as well as any combination of these components within a given embodiment of the invention.

In one or more embodiments of the invention, the payroll repository (140) stores data items needed to generate payroll for a pay period. Accordingly, the payroll repository (140) may store data items detailing the salaries of multiple employees, the hours worked by the employees, the payroll deductions requested by the employees and/or required by law, YTD values for various payroll fields, etc. The payroll repository (140) may also store tax rules and regulations; historical payroll data; payroll reporting data; and/or other payroll related data. Further still, the payroll repository (140) may also store payroll security settings and/or user profiles.

In one or more embodiments of the invention, the payroll repository (140) stores multiple payroll rules (142), each specifying one or more conditions. Specifically, a condition is a Boolean expression including one or more variables corresponding to payroll dollar amounts (e.g., payroll fields). Thus, the Boolean expression evaluates to "TRUE" or "FALSE" depending on the value(s) of the one or more variables. In one or more embodiments of the invention, a payroll rule's condition is said to be satisfied if the condition evaluates to "TRUE." A condition may have any number of variables, any number of nested layers, and any number of mathematical operators (i.e., +, −, ×, ≠, >, <, etc.). Further, payroll rules may be added/modified by employees, employers, and/or third parties (e.g., tax authority). Those skilled in the art, having the benefit of this detailed description, will appreciate that a Boolean expression is any combination of values, variables, operators, and functions that are interpreted according to particular rules of precedence and of association and returning a result of TRUE or FALSE. Boolean expressions may be implemented by a variety of different means, including any number of programming languages and/or definitions.

In one or more embodiments of the invention, a payroll rule further specifies a message. The message may explain the condition, the values required to evaluate the condition (i.e., payroll dollar amounts), and/or changes in the values between pay periods (e.g., changes in net pay amounts). Moreover, the message may be outputted (i.e., displayed, printed, stored, electronically transmitted) when the payroll rule's condition is satisfied. A payroll rule's message may include illustrations, images, graphs, sound, plaintext, and/or other media.

In one or more embodiments of the invention, each payroll rule is associated with rule-metadata. The rule-metadata defines how the payroll rule is to be applied, when the payroll rule is to be applied (e.g., frequency of application), for whom the payroll rule is applied, and/or other rule-related information. A payroll rule may be applied at any time, including times specified by employers, employees, and/or third parties (e.g., tax authority). A payroll rule may be applied to a specific employee and/or a specific group of employees (e.g., human resources personnel).

Consider the following example, which is not meant to limit the invention in any way. A payroll rule's condition may test whether an employee's 401K retirement contribution amount exceeds 15% of the employee's gross pay for a given pay period. Accordingly, the values needed to evaluate the condition include the employee's 401K retirement contribution and the employee's gross pay. As discussed above, these values may be obtained from payroll data (e.g., payroll dollar amounts on the employee's paystub). Further, the payroll rule's message may be the following string: "Your 401K contribution for this pay period has exceeded 15% of your gross pay for this pay period. Please monitor your year-to-date 401K contribution amount and make sure you do not exceed 15% of annual gross earnings." In the event the payroll rule's condition evaluates to "TRUE", the payroll rule's message may be outputted (e.g., printed on the employee's paystub).

Consider the following example, which is not meant to limit the invention in any way. A payroll rule's condition may test whether the sum of the employee's voluntary deductions for the current year are greater than 10% of the employee's gross earnings for the year. Accordingly, the values needed to evaluate the condition include YTD health insurance premiums (medical, dental, and eye care), YTD life insurance premiums, YTD retirement plan contributions (i.e., 401k), YTD employee stock purchase plan amounts, YTD uniform expenses, and YTD union dues. In the event the payroll rule's condition evaluates to "TRUE", a message is sent to the employee informing him that he/she is in violation of company policies and must take corrective action.

Consider the following example, which is not meant to limit the invention in any way. A payroll rule's condition may test whether the amount of an employee's healthcare deduction in a given pay period is different from that of a previous pay period. Accordingly, the values needed to evaluate the condition include the employee's healthcare deduction during the given pay period and the employee's healthcare deduction from the previous pay period. The payroll rule's message may include the following text: "Your healthcare withholding amount has changed from the previous pay period due to a change in the company's selected healthcare providers. This may have changed your net pay for this pay period compared to the previous pay period. If you were a member of our HMO plan, you have automatically been upgraded to the PPO plan in accordance with the company mailing sent on Mar. 1, 2010. Please contact human resources (HR) should you have any further questions." Upon application of the rule (or at some time thereafter), if the payroll rule's condition evaluates to "TRUE," this message may be printed on the employee's paystub as a description of the changed deduction. Further, the employee may consult the message to understand the difference between the employee's net pay for the given pay period and the employee's net pay in the previous pay period.

In one or more embodiments of the invention, when a rule's condition is satisfied, one or more payroll fields of a paystub may be modified according to the rule-metadata. For example, a rule may include a condition that tests whether the YTD 401K deduction for an employee exceeds the yearly contribution limit (e.g., $15,000). In the event the payroll rule's condition evaluates to "TRUE," the 401K deduction amount for future pay periods is reduced to zero. The rule-metadata may also be configured to interact with other software applications and to perform various other functions. In the example given, upon application of the rule, a financial management system may be modified to prohibit the user from increasing his/her 401K deduction amount for the rest of the year.

In one or more embodiments of the invention, the payroll engine (150) is used to process payroll information. The payroll engine (150) may also be responsible for generating paystubs, issuing paychecks, generating payroll reports, periodic payroll processing, initiating Electronic Funds Transfers (EFTs), and/or cross-communicating with various other elements of the system and/or other software systems. Third party software applications may also be responsible for performing any number of these tasks, and as stated previously, may be integrated with the payroll engine (150).

In one or more embodiments of the invention, the payroll engine (150) is configured to generate payroll previews for one or more partially-complete pay periods and/or one or more future pay periods. In one example, halfway through a current pay period, the payroll engine (150) is configured to extrapolate (i.e., estimate) existing payroll data (e.g., hours worked for the current pay period, pay for the current pay period, deductions for the current pay period, etc.) to the end of the current pay period. In addition, the payroll engine (150) is configured to extrapolate (i.e., estimate) existing payroll data to a future pay period. The employee and/or employer may be notified (e.g., via email, text message, etc.) when the payroll data has been extrapolated and is available for viewing.

In one or more embodiments of the invention, the rules engine (151) is responsible for applying the payroll rules (142) to payroll data based on (e.g., according to the schedule set by) the rule-metadata (discussed above). In other words, the rules engine (151) evaluates the conditions specified by the payroll rules (142) using the payroll data. The rule-metadata may specify that the corresponding rule is applied during every pay period or every other pay period. The rule-metadata may also prohibit application of the rule outside of a certain time window. As mentioned previously, rule-metadata may be applied to one or more rules and/or to a category or group of rules. For example, rule-metadata may be implemented by the system in order to periodically update rules and to maintain compliance and integration with one or more outside entities including government tax agencies and/or financial management software applications. In one embodiment, rules may be created and/or updated by the system. In another embodiment, rule-metadata may create new rules. The rules engine (151) may be integrated with other elements of the payroll engine (150) and/or one or more other software applications such that, while processing payroll for a given pay period, the rules engine (151) may generate additional content and/or make modifications to one or more paystubs. The rules engine (151) may also utilize rule-metadata containing logic and/or methods by which the system applies rules and/or processes payroll for one or more pay cycles in accordance with one or more rules. Before, during, or after payroll processing, one or more rules may be applied to one or more payroll fields generated by the payroll engine (150) such that the contents of the payroll may be modified according to the rules.

Figure 5:
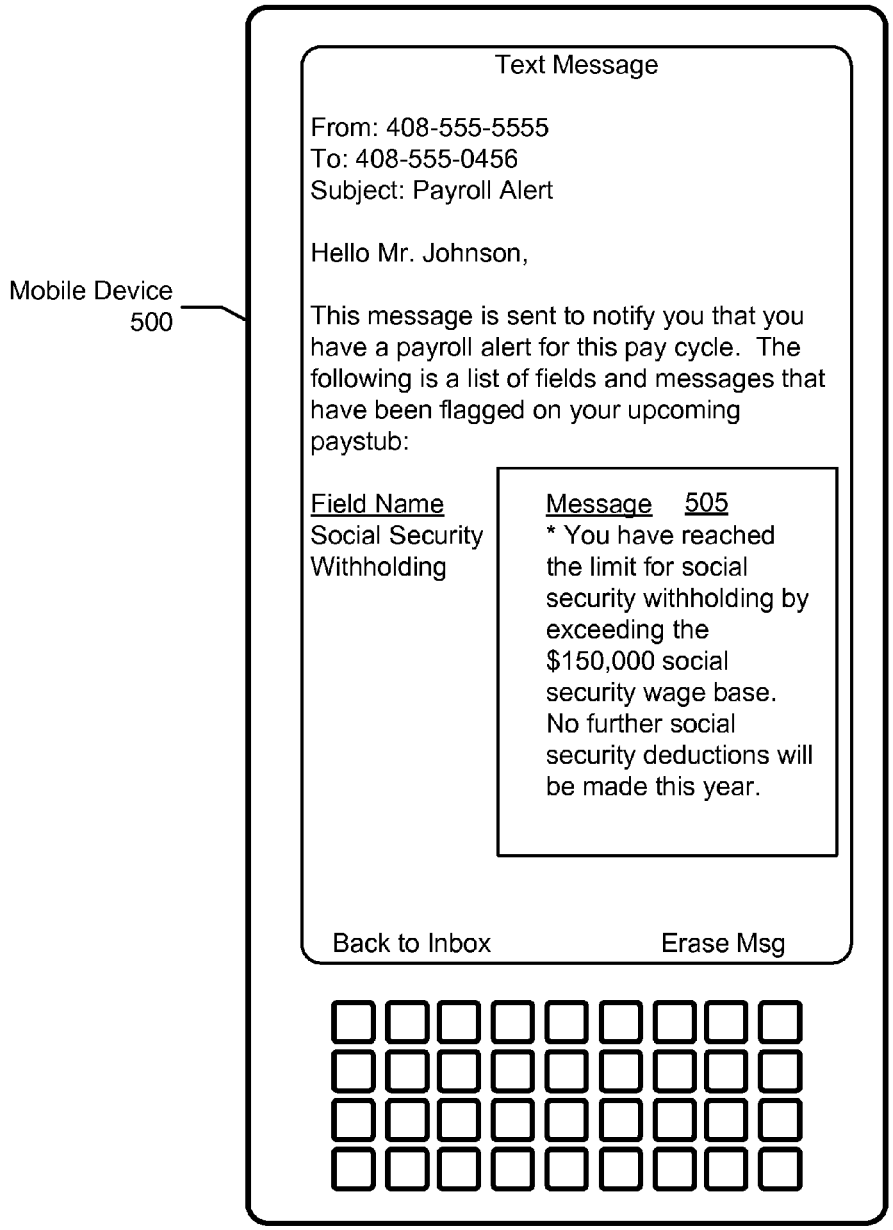
FIG. 5 depicts a mobile device in accordance with one or more embodiments of the invention.

In one or more embodiments of the invention, the message module (152) outputs the message associated with a satisfied rule. Alternatively, a link (e.g., a uniform resource locator (URL)) to the message may be outputted. In one or more embodiments of the invention, the message module (152) outputs the message according to rule-metadata of a rule that is processed by the rules engine (151). Upon application of the rule, the condition of the rule is evaluated. If the condition is satisfied, the message is sent to one or more predefined recipients (i.e., employee, employer, employee's bank or financial institution, another software application, etc.) in accordance with the rule-metadata and/or system-wide settings. For example, an employee may request the message be transmitted to his/her bank. The bank may then wish to notify the employee of the message during an online banking session. In another example, the employer may wish to be notified of messages via a Short Message Service (SMS) message (505) delivered to a mobile device (500) such as a cell phone, as depicted in FIG. 5. One of ordinary skill in the art would note that any established method of electronic communication (e.g., email, text message, instant messenger, etc) can be used by the message module (152) to output messages.

In one or more embodiments of the invention, the payroll portal (110) includes an employer interface (111) for employers to enter, view, and/or modify payroll related information. In one or more embodiments, the payroll portal (110) includes an employee interface (112) for employees to enter, view, and/or modify payroll related information. The payroll portal may also include various other user interfaces for third parties. The employer interface (111), employee interface (112), and the various other interfaces of the payroll portal may allow employers, employees, and/or third parties to receive messages from the payroll engine, including rule messages. The payroll portal (110) may also connect with external server(s), user(s), and/or electronic devices in order to allow rule and/or rule-metadata entry, removal, and/or modification. For example, an external server may be used to periodically update rules in the system to maintain compliance with government regulations and laws.

In one or more embodiments of the invention, the payroll portal (110) includes authentication and security settings that control/restrict user access to the payroll rules (142). In other words, only some users have permission to edit, enable, disable, add, and/or remove payroll rules or rule-metadata. The security settings may restrict some users from even viewing one or more payroll rules. In one or more embodiments of the invention, the employer interface (112), the employee interface (111), and the rest of the payroll portal (110) are networked, integrated, and/or interfaced with a variety of other components both within the system of the current invention and outside of it. As would be evident to one of ordinary skill in the art, one or more commonly known client-server, web-based, and/or other technologies may be used to implement the payroll portal (110) and/or one or more components thereof.

In one or more embodiments of the invention, the payroll portal (110) is configured to accept rules, rule-metadata, and/or rule-related information from a user such as an employer, employee and/or a third party. Through the payroll portal (110), users may input the rule-metadata of a rule defining how a rule is applied, the status of a rule, for whom the rule is to be applied (employee and/or employee group(s)), and/or when the rule is to be applied. In one or more embodiments of the invention, the status of the rule may be enabled, disabled, or pending, and may be modified by a user with appropriate privileges and/or the application of another rule. Only enabled rules may be applied, while pending rules must be approved in order to become enabled. Security settings may be imposed on users of the payroll portal (110) such that only a certain number of rules may be entered by the user. Also, certain users may or may not be authorized to utilize certain fields and/or data when creating rules and may be limited in their application of rules and rule-metadata. Users may be able to apply rules to one or more employees according to their security privileges in the payroll portal (110). Furthermore, any combination of security settings may be applied to the user's of the payroll portal, as well as to the rules. Row-level, page-level, user-level, and/or group-level security may be applied to one or more components of the system including web-interfaces and/or databases.

In one or more embodiments of the invention, the employee interface (112) accepts timesheet (i.e., hours worked, overtime hours) and/or sales information to be used in payroll processing. The employee interface (112) may also accept additional information related to the employee, employer and/or payroll processing for use by the payroll engine. For example, an employee may enter personal information, security permissions, historical payroll data, organizational data, company specific information, and/or salary information into the employee interface (112) to be used in various payroll related processes both inside and outside of the system.

Figure 4:
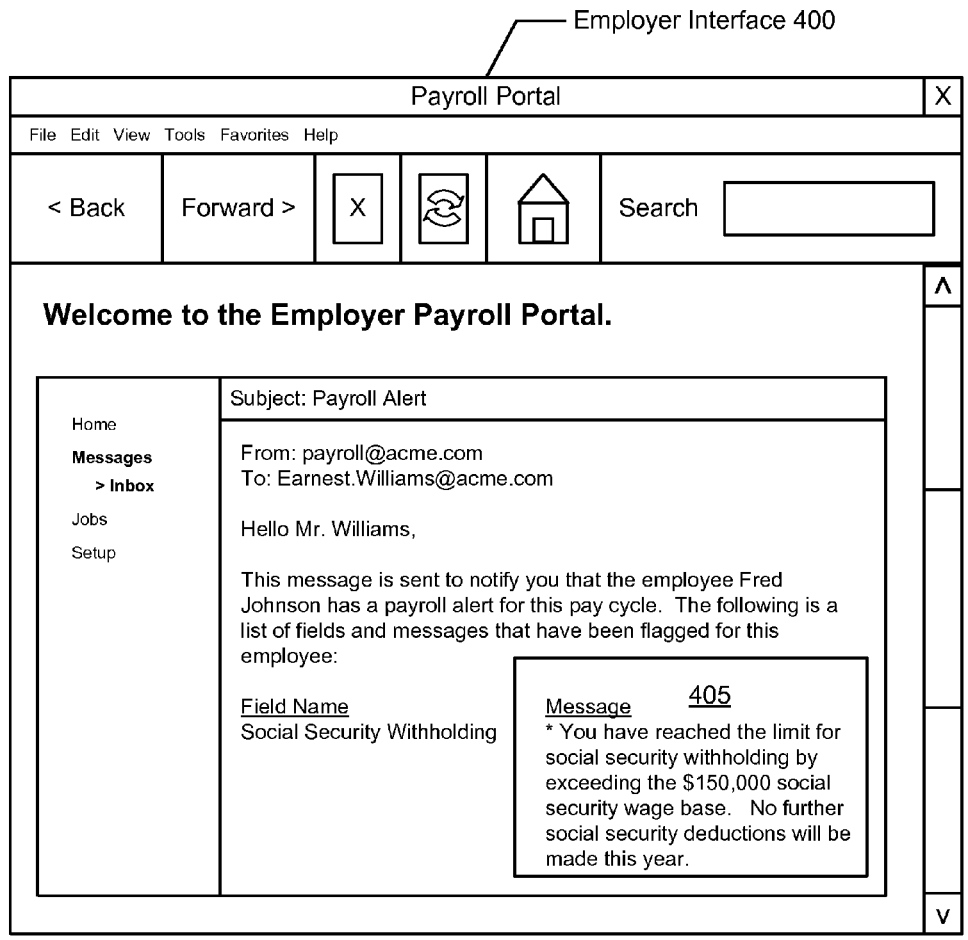
FIG. 4 depicts an example screen shot of an application in accordance with one or more embodiments of the invention.

In one or more embodiments of the invention, the employer interface (111) is configured to allow employer(s) to enter and/or modify information related to the employee, the company, and/or data corresponding to the employee in a given pay period. A pay period or pay cycle may refer to any time interval over which a payroll calculation is made, whether in the past, present, and/or future. In one or more embodiments, the employer interface (111) accepts personal information, security permissions, historical payroll data, organizational data, company specific information, and/or salary information. An example screen shot of a web-based employer interface (400) is shown in FIG. 4. The employer interface (400) includes a message (405) of a satisfied payroll rule.

Still referring to FIG. 1, in one or more embodiments of the invention, the management engine (100) provides interoperability, format conversion and/or cross-compatibility among and between the various components of the system, as illustrated in an exemplary form in FIG. 1. For example, the management engine (100) may transfer data between the payroll portal (110) and the payroll repository (140), or vice-versa. Furthermore, the management engine may be used as a seamless integration point between any combination of the components both within the exemplary system or outside of the exemplary system shown.

In one or more embodiments of the invention, the payroll engine may integrate data and/or functionality from other sources. These may include a financial management application (120), a human resource management system (HRMS), other enterprise software applications, and/or other entities such as a financial institution (130). Additionally, in one or more embodiments, these third party systems may communicate with the payroll engine (150), transfer data to and from the payroll repository (140), and/or correspond with the payroll portal (110) via the management engine (100).

Figure 2:
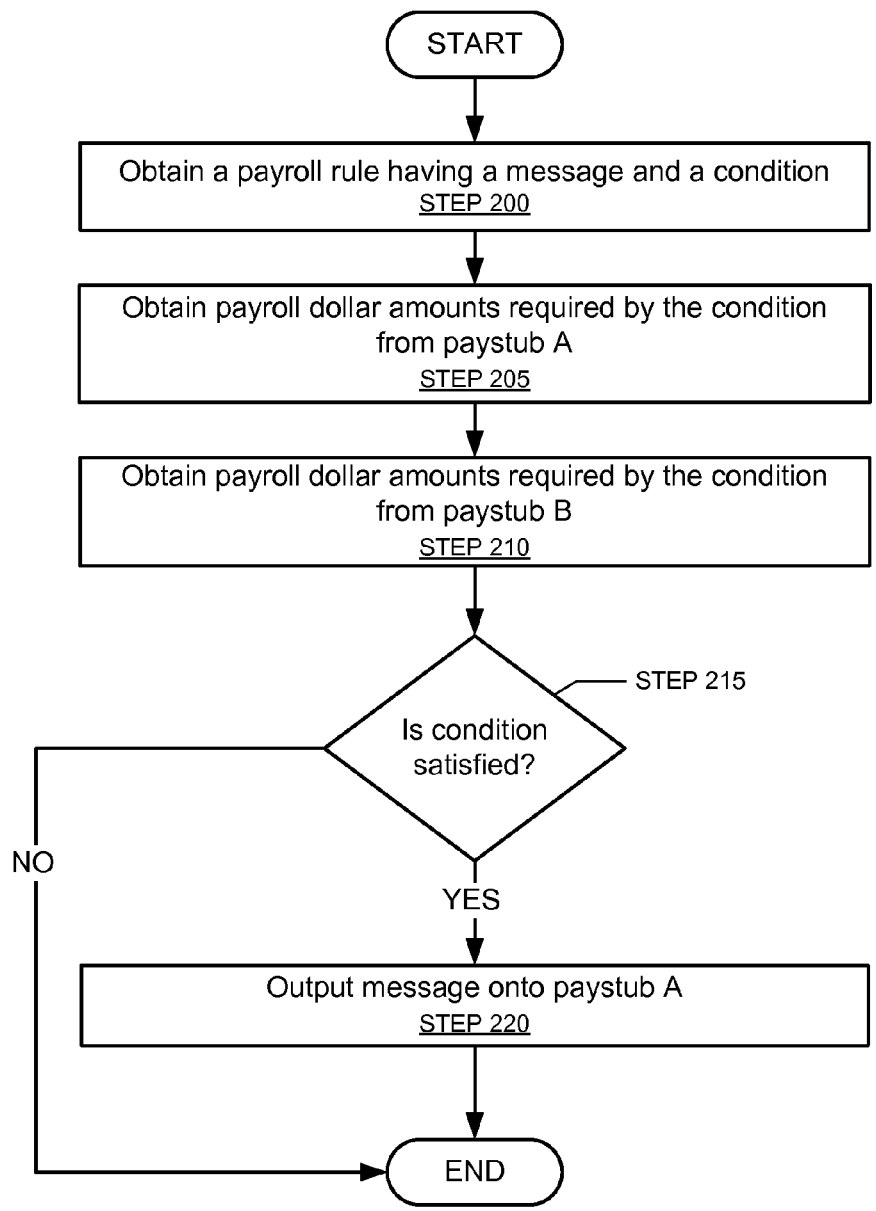
FIG. 2 depicts a flowchart of a method in accordance with one or more embodiments of the invention.

FIG. 2 shows a flowchart in accordance with one or more embodiments of the invention. The steps of the flowchart shown in FIG. 2 may be used to output a message to employers, employees, and/or other entities when a condition associated with a payroll rule and requiring at least one payroll dollar amount is satisfied. Those skilled in the art, having the benefit of this detailed description, will appreciate the order and number of steps shown in FIG. 2 may differ among embodiments of the invention. Further, one or more steps in FIG. 2 may be optional.

Initially, a payroll rule having a condition and/or a message is obtained. The payroll rule may initially be provided by an employee, an employer, and/or any third party or entity (e.g., tax authority). In one or more embodiments of the invention, the payroll rule is applied in response to a trigger defined in the rule-metadata. The trigger may be, for example, the end of a pay period, five days before the end of the pay period, the running of payroll, an explicit request by a user, etc.

In STEP 205, the payroll dollar amounts required by the condition are obtained from paystub A. The payroll dollar amounts may include an employee's sales data, the employee's social security or Medicare deductions, the employee's federal or state income tax withholdings, the employee's YTD pay, and/or other data directly or indirectly related to payroll processing for the paystub A. One or more of the payroll dollar amounts may be calculated based on hours worked, overtime hours, billed hours, sale records, etc. This data may be retrieved from a payroll processing system and/or directly entered by a user. In one or more embodiments of the invention, some payroll data (e.g., hours worked) is projected based on existing payroll data.

In STEP 210, the payroll dollar amounts required by the condition are obtained from paystub B. As stated previously, STEP 210 may be optional. In other words, the condition of the payroll rule only requires payroll dollar amounts from paystub A. Paystub B may pertain to a pay period before the pay period of paystub A. Similar to paystub A, the payroll dollar amounts may include the employee's sales data, the employee's social security or Medicare deductions, the employee's federal or state income tax withholdings, the employee's year-to-date gross salary, and/or other data directly or indirectly related to payroll processing for the pay period(s) associated with paystub B.

In STEP 215, the condition is evaluated. As discussed above, a condition is a Boolean expression including one or more variables corresponding to one or more payroll dollar amounts (e.g., payroll fields) from one or more paystubs (e.g., paystub A and/or paystub B). Further, a condition may have any number of variables, any number of nested layers, and any number of mathematical operators (i.e., $+, -, \times, \neq, >, <$, etc.). When it is determined that the condition is satisfied, the process proceeds to STEP 220. When it is determined that the condition is not satisfied, the process ends.

For example, the condition may test whether the employee's 401K contribution amount for a given pay period varies outside of a tolerance of ±3% from the average amount deducted in the prior 3 pay periods. Accordingly, evaluating the condition requires at least averaging the employee's 401K contribution amounts from the prior 3 pay periods and calculating a difference between the employee's 401K contribution during the given pay period and the average.

In another example, the condition tests whether federal income tax deductions differ between a given pay period and a previous pay period. Federal income tax is an example of a percentage-based deduction. However, the percentage deducted differs between tax payers based on their respective gross pay amounts. A higher gross pay amount corresponds to a higher percentage deduction. In this example, if the federal income tax percentage of the given pay period exceeds the federal income tax percentage of the previous pay period, the condition is satisfied and the rule's message is outputted.

As yet another example, the condition may test whether the employee's net pay for a given pay period is expected to match the employee's net pay of a prior pay period and/or a threshold set by the employee. Accordingly, evaluating the condition may require extrapolating (i.e., estimating) the available payroll data to the end of the given pay period and comparing the estimated/projected net pay with the employee's net pay of the prior pay period.

In STEP 220, the payroll rule's message is outputted. The message may be outputted, for example, as soon as it is determined that the condition is satisfied, at the end of the pay period, 6 days before the end of the pay period (e.g., a preemptive notification), etc. Further, the message may be outputted via an email, a SMS, a fax transmission, a display screen, a printer, an audio recording, an automated telephone (e.g., cell phone) call, etc. Further still, the intended recipient of the message may be the employee, the employer (i.e., human resources personnel), a tax authority, etc. In one or more embodiments of the invention, the message is included on the employee's paystub (e.g., printed on the employee's hardcopy paystub). In one or more embodiments of the invention, the message is displayed to the employee during an online banking session between the employee and a financial institution (e.g., Financial Institution (130), discussed above in reference to FIG. 1) holding an account owned by the employee. In one or more embodiments of the invention, the timing for outputting the rule message, the target recipient of the message, and/or the means for outputting the method is specified in the rule-metadata.

FIG. 3 shows a depiction of an example paystub (300) for a pay period. In this example, the paystub (300) includes multiple payroll fields populated with payroll values. The payroll fields include federal tax withholding, state tax withholding, medical insurance withholding, disability, current earnings, year-to-date earnings, net pay, and/or other fields related to and/or used in the calculation of the employee's net pay. The paystub also includes other information related to a paycheck, the employee, and/or the company, including explanatory text, tax exemption information, employee name and address, as well as job related information such as employee position, and etc.

Still referring to FIG. 3, consider the following: an employer has defined a rule with a condition that tests whether an employee's check is subject to the social security deduction for a given pay period. The condition of this rule returns "TRUE" if an employee's YTD earnings exceed $150,000. The message associated with this rule is as follows: "You have reached the limit for social security withholding by exceeding the $150,000 social security wage base. No further social security deductions will be made this year." The employer has entered the rule into the system using the employer interface (111) of the payroll portal (110) and the system has stored the rule in the payroll repository (140) as a payroll rule (142). The following is an Extensible Markup Language (XML) code snippet illustrating one implementation of the rule in accordance with this example:

```
<rule name="SS_Withholding_Limit">
   <condition>
      <operation type="greater_than" value="150000">
         <field name="Gross_Income_YTD" />
      </operation>
   </condition>
   <message>
      You have reached the limit for social security withholding by
      exceeding the $150,000 social security wage base. No further
      social security deductions will be made this year.
   </message>
</rule>
```

In this example, when the rule was applied by the rules engine (151) during payroll processing, the condition evaluated to "TRUE." Accordingly, the message was printed on the employee's paystub (300) in the "ALERTS" section (305).

As another example, consider a rule for pro-actively notifying an employee and an employer (i.e., the employee's manager) of an upcoming change to the employee's social security deduction. The employee's projected future pay roll amounts may be calculated based on historical data (i.e., past trends), or a pre-defined fixed salary, depending on their pay structure. In this example, assuming the Social Security wage base is $150,000 per year, the employee and employer wish to be notified in an earlier pay period if the employee is close to reaching this year-to-date gross taxable income limit. Specifically, the employer defines a rule requesting an alert if the employee's projected gross year-to-date income for the next pay period exceeds $150,000. Thus, if the employee earns a fixed salary of $5,000 per pay period, he and his manager will be alerted with a message via the message module (152) upon reaching a year-to-date gross income amount of $145,000.

Figure 6:
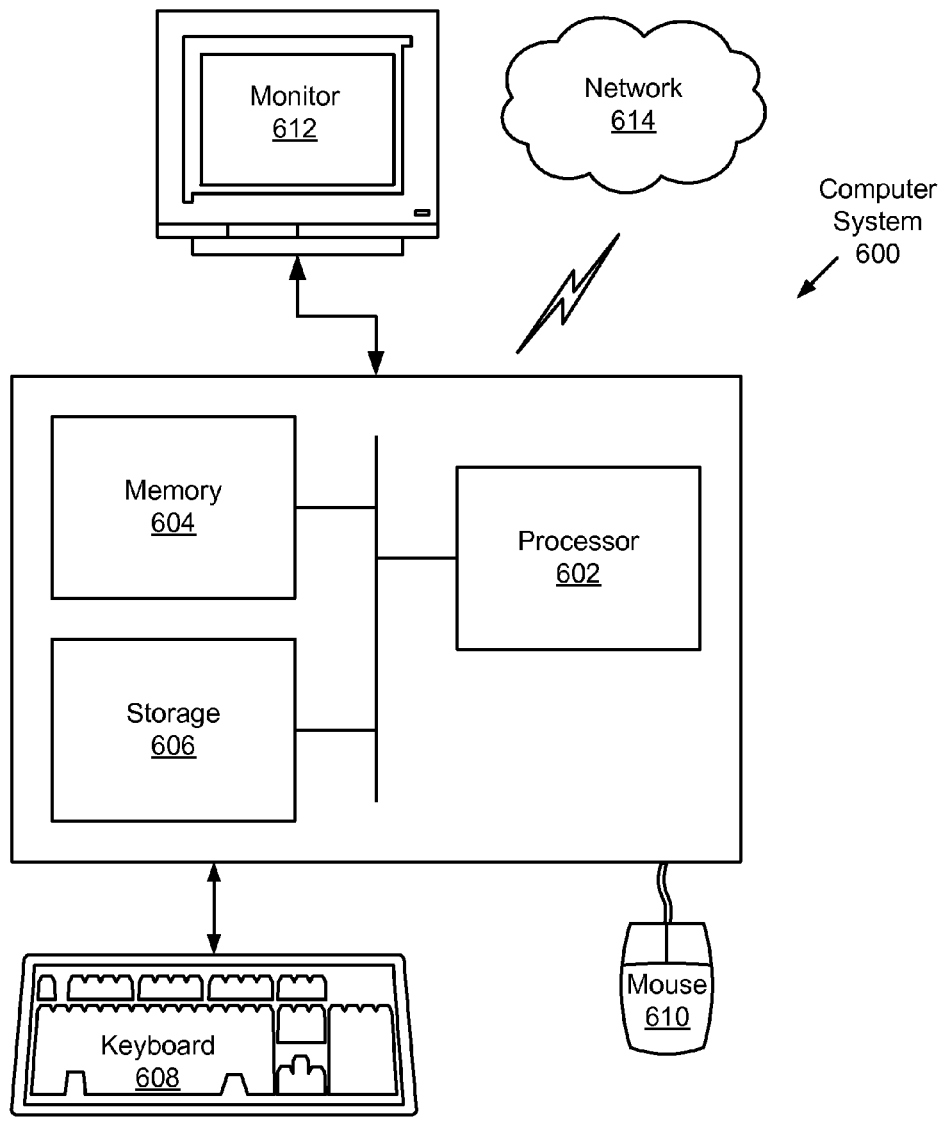
FIG. 6 depicts a computer system in accordance with one or more embodiments of the invention.

Embodiments of the invention may be implemented on virtually any type of computer regardless of the platform being used. For example, as shown in FIG. 6, a computer system (600) includes one or more processor(s) (602) (such as a central processing unit (CPU), integrated circuit, etc.), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer system (600) may also include input means, such as a keyboard (608), a mouse (610), or a microphone (not shown). Further, the computer system (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, in one or more embodiments of the invention, one or more elements of the aforementioned computer system (600) may be located at a remote location and connected to the other elements over a network. Further, embodiments of the invention may be implemented on a distributed system having a plurality of nodes, where each portion of the invention (e.g., message module (152), payroll engine (150), payroll portal (110), etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a tape, memory, or any other tangible computer readable storage device.

One or more embodiments of the invention have one or more of the following advantages. Changes in an employee's pay can be explained on the employee's paystub and/or through various other forms of notification. Rules can be created with complex Boolean expressions requiring values from multiple fields on the paystub such that historical and projected future amounts trigger messages to be sent. Also, rules can be enabled and/or disabled by employees as well as employers and may be applied company-wide, individually, user groups and/or employee groups. Alerts can be sent to financial institutions, internal and external software applications, email addresses, and/or mobile devices when a rule is applied. Thus, employers, employees, and specified third parties are better informed regarding potential changes in the calculation and processing of their pay.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method for payroll notification, comprising:
    obtaining, by a computer processor, a payroll rule comprising a message and a condition, wherein the condition requires a first gross pay, a first net pay, a second gross pay, and a second net pay;
    obtaining the first gross pay and the first net pay of a previously issued paycheck of an employee;
    obtaining the second gross pay and the second net pay of a current paycheck of the employee;
    determining, by the computer processor, that the first gross pay is equal to the second gross pay;
    determining, by the computer processor, that there is a non-zero difference between the first net pay and the second net pay;
    determining, by the computer processor, that the condition of the payroll rule is satisfied based on the first gross pay being equal to the second gross pay and further based on the non-zero difference between the first net pay and the second net pay; and
    outputting, in response to the condition being satisfied, the message of the payroll rule onto a paystub of the current paycheck specifying the condition and explaining the non-zero difference between the first net pay and the second net pay.

2. The computer-implemented method of claim 1, wherein the paystub comprises a financial value obtained from extrapolation.

3. The computer-implemented method of claim 1, wherein the payroll rule is enabled by an employer of the employee.

4. The computer-implemented method of claim 1, further comprising outputting the message to an employer of the employee by email.

5. The computer-implemented method of claim 1, further comprising outputting the message to a financial institution having an account of the employee, wherein the message is displayed to the employee during an online banking session.

6. A non-transitory computer-readable storage medium storing a plurality of instructions for payroll notification, the plurality of instructions comprising functionality to:
    obtain a payroll rule comprising a message and a condition, wherein the condition requires a first gross pay, a first net pay, a second gross pay, and a second net pay;
    obtain the first gross pay and the first net pay of a previously issued paycheck of an employee;
    obtain the second gross pay and the second net pay of a current paycheck of the employee;
    determine that the first gross pay is equal to the second gross pay;
    determine that there is a non-zero difference between the first net pay and the second net pay;
    determine that the condition of the payroll rule is satisfied based on the first gross pay being equal to the second gross pay and further based on the non-zero difference between the first net pay and the second net pay; and
    output, in response to the condition being satisfied, the message of the payroll rule on a paystub of the current paycheck specifying the condition and explaining the non-zero difference between the first net pay and the second net pay.

7. The non-transitory computer-readable storage medium of claim 6, wherein the plurality of instructions further comprise functionality to:
    output the message to a financial institution having an account of the employee, wherein the message is displayed to the employee during an online banking session.

8. The non-transitory computer-readable storage medium of claim 6, wherein the plurality of instructions further comprise functionality to:
    output the message to an employer of the employee by email.

9. A system for payroll notification, comprising:
    a computer processor;
    a payroll engine executing on the computer processor and configured to:
        obtain a payroll rule comprising a message and a condition, wherein the condition requires a first gross pay, a first net pay, a second gross pay, and a second net pay;
        obtain the first gross pay and the first net pay of a previously issued paycheck of an employee;
        obtain the second gross pay and the second net pay of a current paycheck of the employee;
        determine that the first gross pay is equal to the second gross pay;
        determine that there is a non-zero difference between the first net pay and the second net pay; and
        determine that the condition of the payroll rule is satisfied based on the first gross pay being equal to the second gross pay and further based on the non-zero difference between the first net pay and the second net pay; and a message module executing on the computer processor and configured to:

output, onto a paystub of the current paycheck and in response to the condition being satisfied, the message of the payroll rule specifying the condition and explaining the non-zero difference between the first net pay and the second net pay.

10. The system of claim 9, further comprising a payroll portal operatively connected to the payroll engine and comprising an interface used by the employer of the employee to enable the payroll rule.

11. The system of claim 9, wherein the message module is further configured to output the message to an employer of the employee by email.

12. The system of claim 9, wherein the message module is further configured to output the message to a financial institution having an account of the employee, wherein the message is displayed to the employee during an online banking session.

13. The computer-implemented method of claim 1, wherein the condition further requires a payroll dollar amount, and wherein the computer-implemented method further comprises:

generating a comparison of the payroll dollar amount with a threshold amount; and determining, based on the comparison, that the payroll dollar amount exceeds the threshold amount, wherein determining that the condition is satisfied is further based on the payroll dollar amount exceeding the threshold amount.

14. The computer-implemented method of claim 13, wherein the payroll dollar amount is a year-to-date (YTD) retirement contribution by the employee, and wherein the threshold amount is a retirement contribution limit.

15. The computer-implemented method of claim 13, wherein the payroll dollar amount is a year-to-date (YTD) pay of the employee, and wherein the threshold amount is a social security wage base.

16. The computer-implemented method of claim 13, wherein determining that the condition is satisfied comprises calculating a non-zero difference between the payroll dollar amount on the previously issued paycheck and a payroll dollar amount on the current paycheck.

17. The non-transitory computer-readable storage medium of claim 6, wherein the condition further requires a payroll dollar amount, and wherein the plurality of instructions further comprise functionality to:

generate a comparison of the payroll dollar amount with a threshold amount; and determine, based on the comparison, that the payroll dollar amount exceeds the threshold amount, wherein determining that the condition is satisfied is further based on the payroll dollar amount exceeding the threshold amount.

18. The non-transitory computer-readable storage medium of claim 17, wherein determining that the condition is satisfied comprises calculating a non-zero difference between the payroll dollar amount on the previously issued paycheck and a payroll dollar amount on the current paycheck.

19. The system of claim 9, wherein the condition further requires a payroll dollar amount, and wherein the payroll engine is further configured to:

generate a comparison of the payroll dollar amount with a threshold amount; and determine, based on the comparison, that the payroll dollar amount exceeds the threshold amount, wherein determining that the condition is satisfied is further based on the payroll dollar amount exceeding the threshold amount.

20. The system of claim 19, wherein the payroll dollar amount is a year-to-date (YTD) pay of the employee, and wherein the threshold amount is a social security wage base.

* * * * *